Oct. 26, 1965 V. R. GODWIN 3,213,821
CONVERTIBLE HYDROMOBILE
Filed March 10, 1964 5 Sheets-Sheet 1
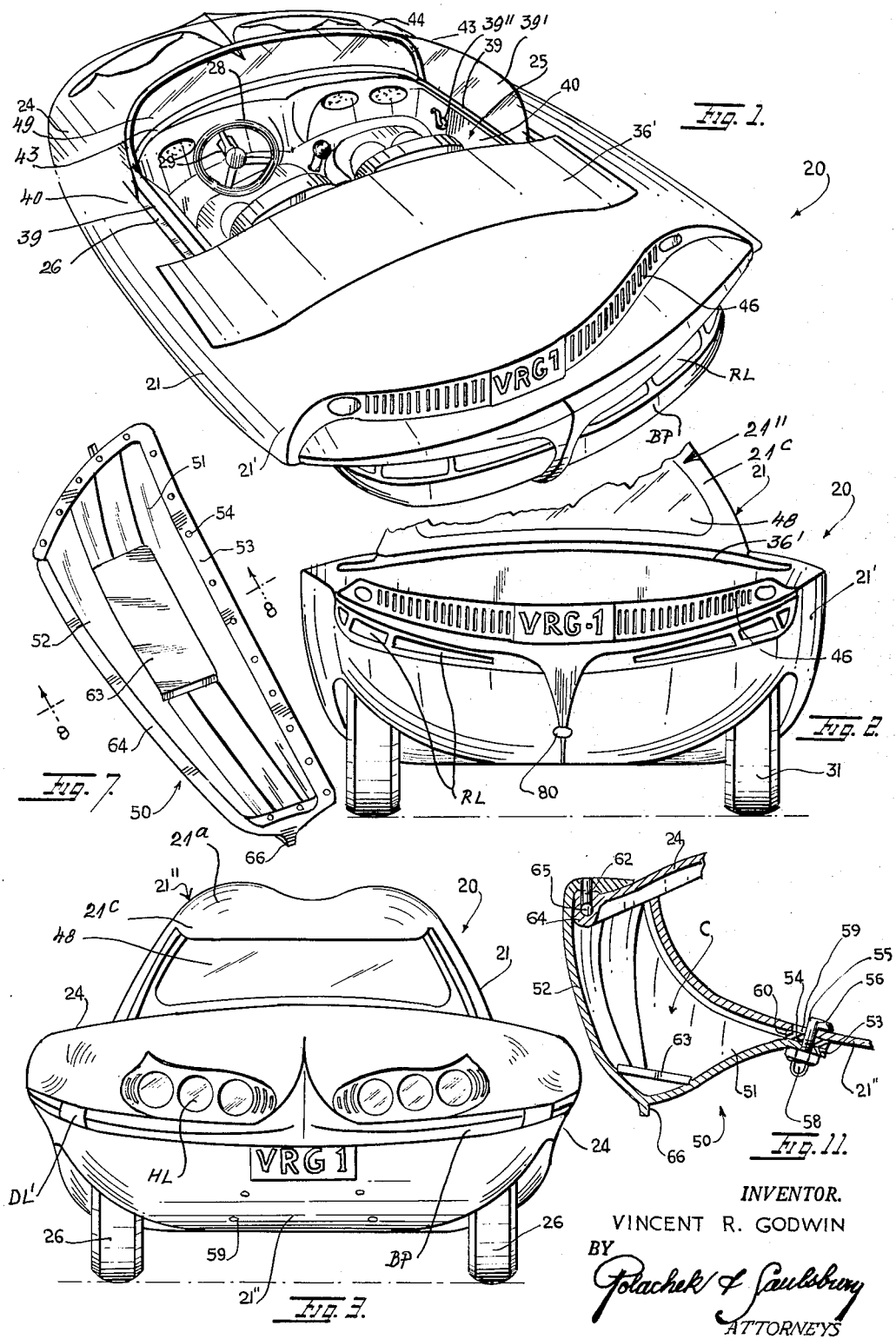
INVENTOR.
VINCENT R. GODWIN
BY
Polachek & Saulsbury
ATTORNEYS

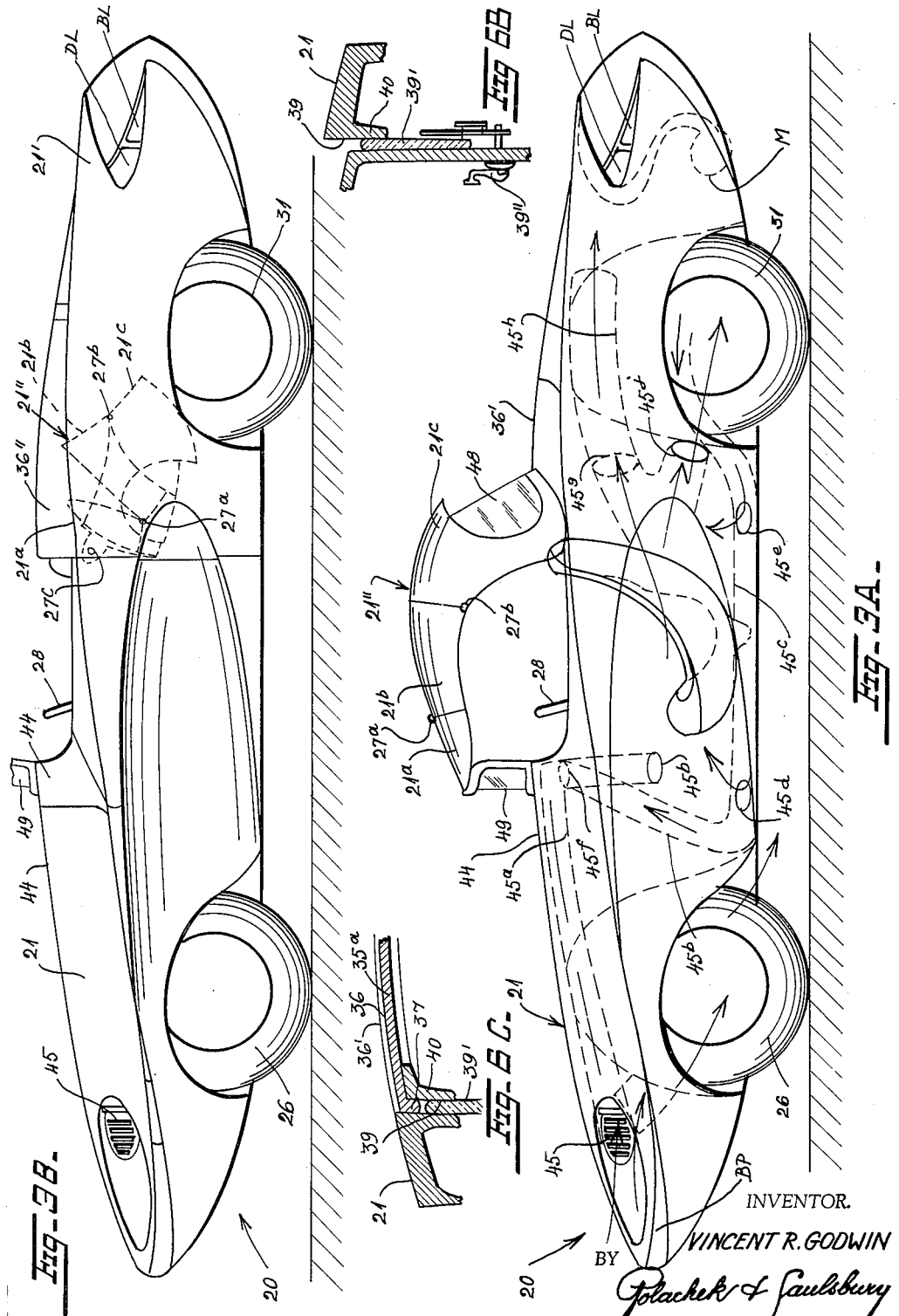

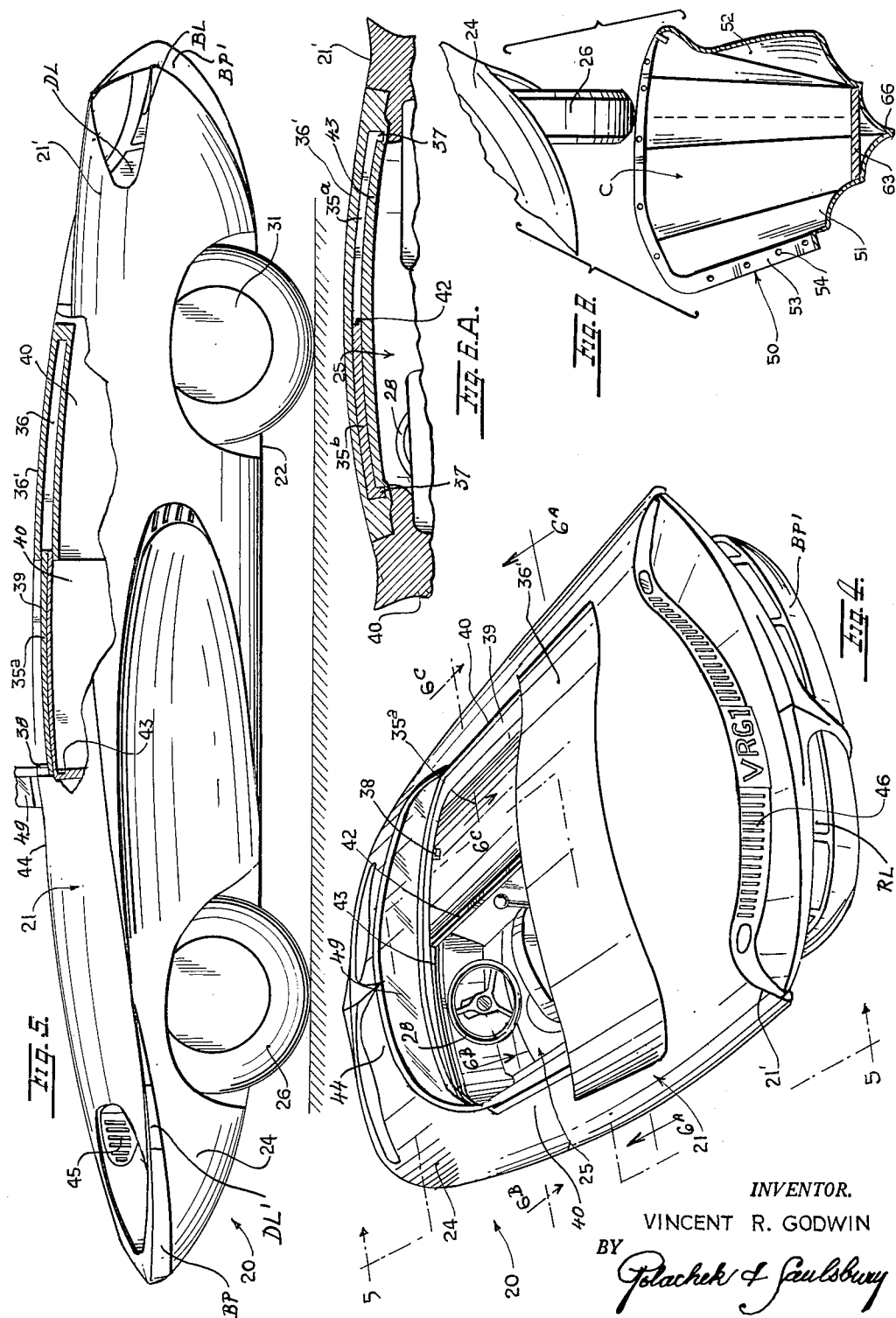

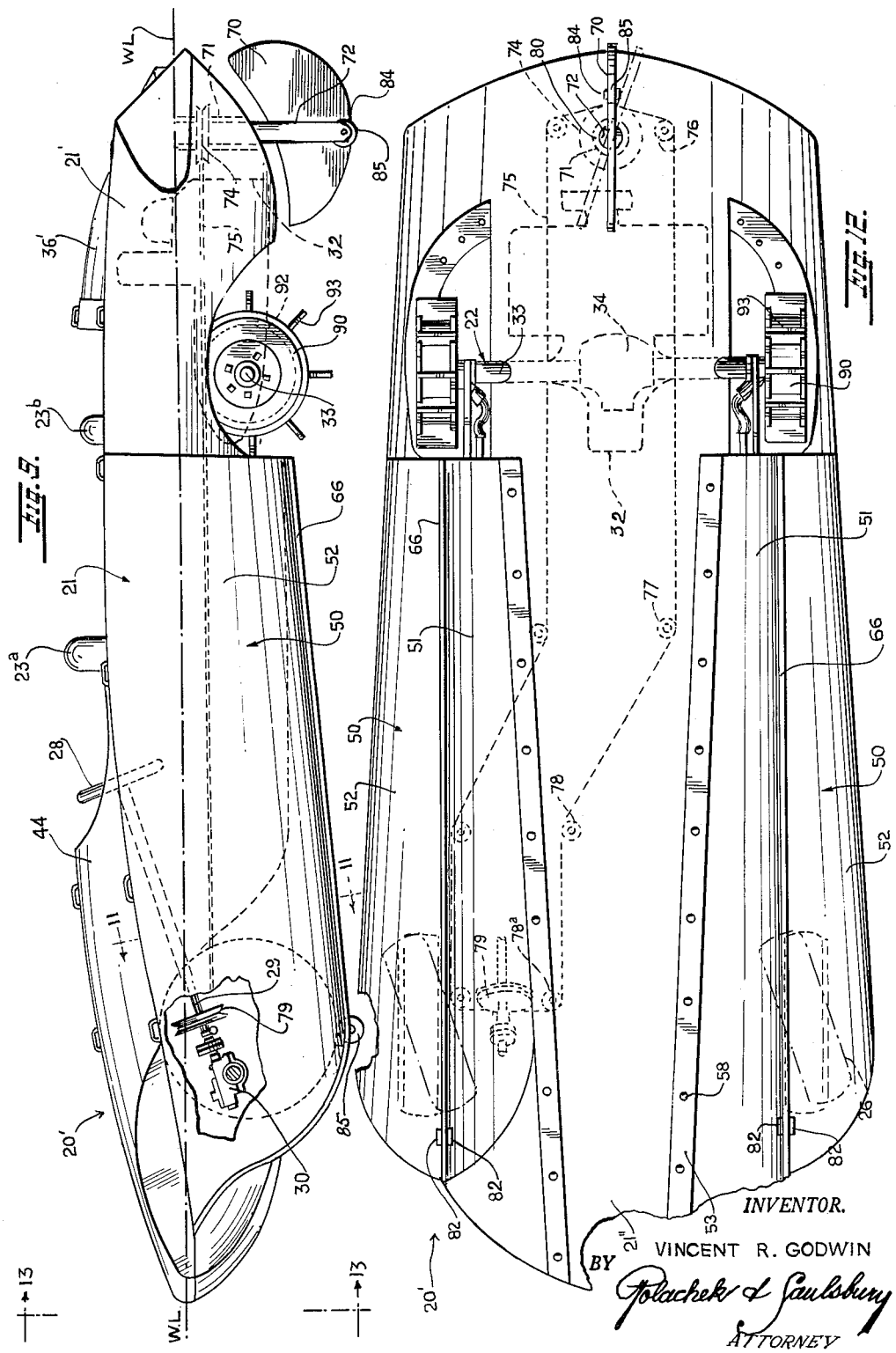

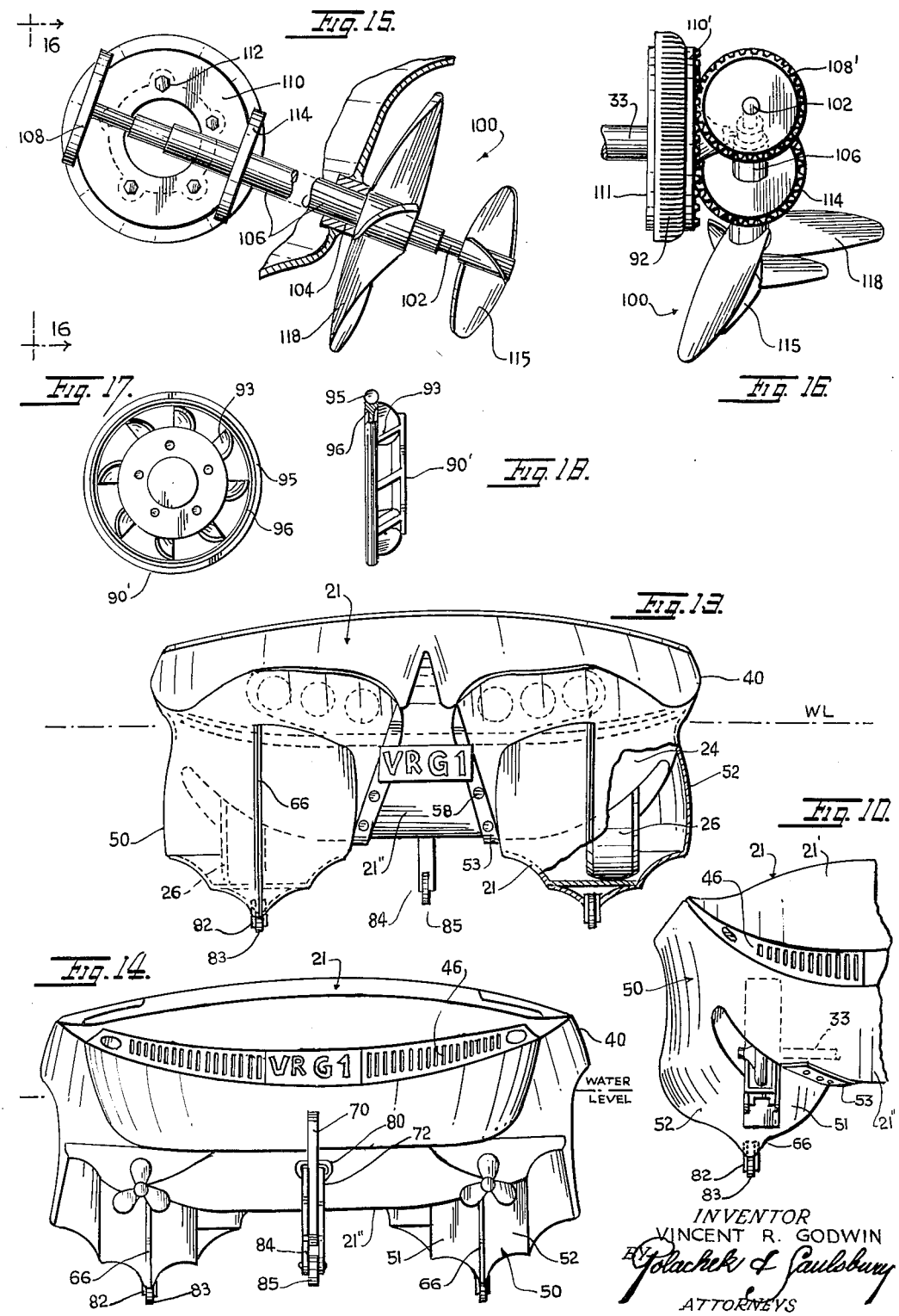

United States Patent Office 3,213,821
Patented Oct. 26, 1965

3,213,821
CONVERTIBLE HYDROMOBILE
Vincent R. Godwin, 1700 Longfellow Ave.,
Bronx 60, N.Y.
Filed Mar. 10, 1964, Ser. No. 350,818
6 Claims. (Cl. 115—1)

This invention relates to an automotive land vehicle which is convertible to travel on water.

According to the invention there is provided an automobile which has a streamlined body. Pontoons are provided which can be attached to the body of the automobile to enclose the front wheels and headlamps and define watertight air chambers which render the vehicle buoyant so that it can be driven on water. The body of the vehicle has a collapsible hard top and vertically sliding side windows. Horizontal sliding doors are also provided so that the passenger compartments of the vehicle can be opened and closed at will. Paddle wheels or screw propellers can be mounted on or operatively connected to the wheel drums in place of the usual rear wheels for propelling the vehicle in water. A rudder can be attached to the chassis of the vehicle and connected to a drive belt operable by a drive mechanism from the steering wheel of the vehicle. Small rollers or wheels can be provided on the rudder and pontoons to facilitate launching the vehicle in water from a beach, ramp or dock.

It is one object of the invention to provide a streamlined sports type of automobile having a lightweight body and chassis, with means for converting the automobile to travel on water.

Another object is to provide an automobile body with removable pontoons to render the same buoyant and form the hull of a catamaran-like boat.

A further object is to provide drive means for adapting an automobile equipped with pontoons for traveling in water by power taken off from the engine of the automobile.

Another object is to provide an automobile equipped with pontoons, with a rudder operable by the steering mechanism of the automobile.

Still another object is to provide an automobile as described with a passenger compartment having sliding doors defining a rigid tarpaulin to close and secure the vehicle when not in use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective rear, side and top view of an automobile with top retracted, according to the invention.

FIG. 2 is a rear elevational view of the automobile, with top up, part being broken away.

FIG. 3 and FIG. 3A are front and side elevational views respectively of the automobile, with hard top raised.

FIG. 3B is a side view with the hard top retracted. taken on line 5—5 of FIG. 4.

FIG. 4 is a perspective view similar to FIG. 1, showing one sliding door in closed position.

FIG. 5 is a side elevational view partially in section, taken on line 5—5 of FIG. 4.

FIGS. 6A, 6B and 6C are sectional views taken on lines 6A—6A, 6B—6B and 6C—6C, respectively, of FIG. 4.

FIG. 7 is a top perspective view of a pontoon.

FIG. 8 is a sectional view taken on line 8—8 of FIG. 7 shown with a portion of the automobile.

FIG. 9 is a side view of the automobile converted to a boat.

FIG. 10 is a rear elevational view of part of the boat of FIG. 9.

FIG. 11 is a fragmentary sectional view taken on line 11—11 of FIG. 9.

FIG. 12 is a bottom plan view partially diagrammatic in form of the converted automobile of FIG. 9, parts being broken away.

FIG. 13 is a front view of the boat taken on line 13—13 of FIG. 9, parts being broken away.

FIG. 14 is a rear view of a converted automobile embodying a modification of the invention.

FIG. 15 is a side view of propeller apparatus which may be used in an automobile converted to a boat.

FIG. 16 is an end elevational view of the apparatus of FIG. 15.

FIG. 17 is a side view of a paddle wheel which can be used in an automobile converted to a boat.

FIG. 18 is an edgewise view partially in section of the paddle wheel of FIG. 17.

Referring to the drawings, there is shown in FIGS. 1–6, a land vehicle 20 which can be converted to a boat 20' such as shown in FIGS. 9–13. The land vehicle is preferably a passenger automobile having a streamlined sports type of body 21 on a chassis 22. The body has front fenders 24 partially covering front wheels 26. The wheels are manually turned or steered by a steering wheel 28 in passenger compartment 25. The wheel 28 is mounted on post 29 and is operatively connected to the wheels by a conventional steering mechanism 30 forming part of the chassis; see FIG. 9. The rear wheels 31 are mounted on axles 33 and are driven by a rear engine 32 via differential 34. The rear wheels are partially covered by the rear body portion 21'.

The passenger compartment 25 can be wholly or partially covered by a pair of horizontally mounted independently slidable doors 35a, 35b. These doors can be retracted rearwardly into a deck compartment 36 having a top deck or panel 36', best shown in FIGS. 5 and 6. Knob handles 38 are provided at the upper sides of the doors near their front edges. The doors 35a, 35b have lateral flanges 37 slidably engaged in side window slots 39 of side walls 40. Windows 39' slide in slots 39. Adjacent edges 42 of the doors are dovetailed or formed with tongue and groove, respectively, and are slidably engaged in close frictional fit. Thus, either one or both doors can be moved forward or retracted. When moved fully forward the front edges of the doors seat on a ledge 43 formed at the rear end of the cowl 44 of the body 21.

Air intake vents 45 are provided at the front of the body to ventilate the passenger compartment when the vehicle is in motion. Air outlet vents 46 are provided at the rear of the body to discharge the air circulated through the engine compartment. Air entering side vents is also used to cool the engine 32 which is preferably of the air-cooled type commonly used in sport cars.

A hard top 21" consisting of three sections 21a, 21b and 21c pivotally secured together by hinges 17a, 27b is mounted over the passenger compartment. The front end of the top section 21a engages on the top edge of windshield 49. The hard top can be collapsed and retracted from the upright position shown in FIG. 3A. Section 21a pivots on pins 27c when the hard top is retracted at the rear of the passenger compartment 25, as indicated by dotted lines in FIG. 3B.

Windows 39' are movable in side slots 39. These windows can be elevated by window handles 39" shown in FIG. 6B to close with lateral edges of the hard top section for enclosing the passenger compartment.

The sliding doors 35a, 35b are closed only when the vehicle is not in use. The closed doors serve like a tarpaulin to cover and close the passenger compartment. The sliding doors in effect constitute a permanent hard tarpaulin.

The front vents 45 of the vehicle serve to ventilate the passenger compartment 25 via conduit 45a shown in dotted lines in FIG. 3A. Conduit 45a has an outlet 45b in compartment 25. Hot air is conveyed via a conduit 45c from a rear heater (not shown). The hot air is discharged from conduit 45c into the passenger compartment at vents 45d, 45e. The hot air is also discharged from end 45f of the conduit 45c at vents below the windshield 49 for defrosting purposes. An inside vent 45g is provided opening into conduit 45h. This supplies air to the engine compartment for cooling the engine when the vehicle is used for water travel. Side vents in the body open into the engine compartment and admit air for cooling the engine when the vehicle is used for land travel. Vent 45j passes air out of the passenger compartment directly to the engine compartment. The rear vents 46 allow passage of air out of the engine compartment to the exterior of the vehicle.

During mild weather conditions, the vehicle is driven with the passenger compartment open. During inclement weather, the folding, retractable hard top roof 21" and raised side windows 39' completely enclose the passenger compartment. Ventilation is provided through the conduit 45a as described above. When the hard top is elevated, the front edge of the forward fold of the top section 21a engages to top edge of the windshield 49. The bottom of the rear edge of section 21c fits flush on the rear deck 36'.

Section 21c has a rear window 48. Rear lights R1 are provided under rear vents 48 and above rear bumper BP'. Back-up lights and directional lights DL are also provided at the rear. At the front of the automobile is provided a bumper BP, headlamps HL and directional lights DL'.

It is possible to enlarge the passenger compartment by removing top 21" to seat four persons, two in the front seats 23a and two in the front seats 23b, as shown in FIG. 9.

In order to convert the land vehicle to a catamaran type of boat for water travel, there is provided a pair of large, elongated pontoons 50. These pontoons are hollow, rigid shells made of light metal such as aluminum or a plastic material such as polyester resin reinforced with fiber glass. The pontoons, as best shown in FIGS. 7–9 and 11, are externally convex and internally concave. The side walls, 51, 52 of each pontoon are curved for strength and rigidity and to enclose a large volume of air when the pontoons are attached to the vehicle body. In order to effect this attachment there is provided a long narrow flange 53 at the upper edge of wall 51. Holes 54 are spaced along this flange. These holes permit passage of hook bolts 55; see FIG. 11. The hooks 56 of the bolts pass through holes 59 and engage on the upper side of body wall 21". This body wall extends for substantially the full length of the body; see FIG. 12. Cap nuts 58 are provided on the bolts. A long flat resilient sealing strip or pad 60 is interposed between flange 53 and the underside of body wall 21".

At the upper edge of outer wall 52 of each pontoon is a depending flange 62 which engages in a channel 64 formed at the upper edge of each front fender 24. A resilient sealing strip or gasket 65 is provided in each of the channels 64 to seal the free edge of flange 62. The pontoon is thus sealed all around its periphery to define an airtight and watertight chamber C of large air capacity.

The front wheels 26 are wholly enclosed and contact lightly a pad 63 in each pontoon, or rest on a platform that makes contact only with the suspension system, allowing for the wheels to have no contact with the internal walls of the pontoon. The wheels 26 turn angularly inside the pontoons when the steering wheel 28 is turned. The light frictional engagement of the pads and wheels prevent the wheels from turning on their axles, without materially preventing turning of the wheels on vertical axes. The lower portions of the walls 51, 52 define rather large wells in which the wheels 26 are disposed. A central keel 66 is formed at the bottom of each pontoon to reduce water turbulence and drag when the vehicle is operated as a boat.

In order to steer the vehicle when converted to a boat as shown in FIGS. 9 and 10, there is provided a rudder 70 pivotally carried on a sleeve shaft 71 to which is detachably secured a post or shaft 72. On this shaft is a pulley 74. An endless belt 75 is engaged on pulley 74 and passes via idler guide pulleys 76, 77, 78, 78a, a drive pulley 79 mounted on the steering post or shaft 29 of the vehicle. Thus, when the steering wheel 28 is turned in one direction or another, the rudder turns with it. The rudder 70 and shaft 72 are removed when the vehicle is used as an automobile. When the vehicle is to be used as a boat, the shaft 72 is inserted through a hole 80 provided at the rear of the vehicle body, see FIG. 2, and is locked by a bayonet joint or the like to the sleeve shaft 71 on which pulley 74 is mounted.

Wells 82 may be provided on the keels 66 of the pontoons. Wheels 83 are freely rotatable in these wells. Another well 84 can be provided at the bottom of rudder 70 with a wheel 85 in this well. The wheels 83 and 85 facilitate launching the vehicle into water down an inclined ramp or beach when it is converted from a land vehicle to a boat. The wells and wheels 83, 85 are small and do not materially affect movements of the vehicle in the water.

The rear wheels and tires 31 of the vehicle can be removed and paddle wheels 90 can be bolted on the rear brake drums 92. These paddle wheels have flat vanes or paddles 93 which effectively drive the vehicle in forward and reverse directions when the paddle wheels are immersed below water level WL; see FIGS. 9, 10 and 12.

Instead of paddle wheels 90 with flat vanes or paddles, paddle wheels 90' having twisted or cup-shaped paddles or vanes 93' as shown in FIGS. 17 and 18 can be used. This wheel may have a rubber tire 95 engaged on wheel rim 96.

Propeller assemblies 100, as shown in FIGS. 15 and 16, can be used to drive the vehicle in water in place of paddle wheels. Each assembly includes a shaft 102 extending through a sleeve bearing 104 and through a sleeve shaft 106. At the upper end of the shaft 102 is a friction wheel 108 or matching gear 108' which is frictionally engaged with and is turned by a friction plate 110 or geared plate 110' secured by bolts 112 to brake drum 92. Sleeve shaft 106 carries a friction wheel 114 or gear 114' also engaged with plate 110 and turned thereby. It will be apparent that when the brake drum 92 is turned on axle 33, the shafts 102 and 106 turn in opposite directions. A screw propeller 115 is secured to the lower end of shaft 102 and another screw propeller 118 having a helical twist opposite to that of propeller 115 is secured to the lower end of shaft 106. The sleeve bearings 104 are mounted at the rear of the attachable watertight section.

The twin screw arrangement of propellers on opposite sides of the vehicle provides four driving propellers for the vehicle which will be effective to drive the vehicle in water at rather high speeds.

The vehicle embodying the invention is characterized by an attractive, streamlined appearance, easy maneuverability, and quick convertibility. When the pontoons, paddle wheels or propeller, and rudder are removed the vehicle appears and serves as a sports type of automobile. The removed parts can be stowed in the trunk of the vehicle. When the vehicle is converted for water travel, it is an attractive watercraft for pleasure and sports use.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A land vehicle convertible for water travel, comprising a lightweight, streamlined, rigid body having two front fenders on opposite sides, a central passenger compartment, wheels under the front fenders, a steering wheel on a steering post in said compartment, said steering post being operatively connected to the front wheels for steering the same on land, an engine inside said body, rear brake drums operatively connected to said engine and driven thereby, a rudder shaft at the rear of and inside said body, a belt and pulley system operatively connecting said rudder shaft and steering post whereby said rudder shaft is under control of said steering wheel, said brake drums interchangeably supporting rear wheels for land travel and water drive for water travel, said rudder shaft serving to support a removable rudder for steering in water, said body having a closed underside extending substantially the full length of said body, said fenders and underside of said body having means for detachably supporting pontoons at opposite sides of said body to provide chambers for increasing buoyancy of the body, said body having a folding retractable hard top roof over said compartment, and a pair of horizontal doors slidably disposed and movable forwardly to close said compartment, said body having air vents at its front end communicating with said compartment to ventilate the compartment when the vehicle is in motion.

2. A land vehicle of the character described converted for water travel, comprising a lightweight streamlined body having front fenders, a central passenger compartment, front wheels under the front fenders for land use of the vehicle, a steering wheel on a steering post in said compartment for operation by a driver, said post being operatively connected to the front wheels for steering the same on land, an engine inside said body, rear brake drums operatively connected to said engine and driven thereby, a rudder shaft at the rear of and inside body, a rudder outside the body at the rear end thereof detachably engaged with said rudder shaft, a belt and pulley system operatively connecting said rudder shaft and steering post whereby the rudder is under control of said steering wheel, water drive means detachably mounted on the rear brake drums, said body having a closed underside, and elongated pontoons detachably secured to said front fenders and the underside of said body in airtight and water tight sealed relationship to define two large closed air chambers to render the body buoyant, said pontoons having central keels on their undersides, and a freely rotatable wheel carried by each keel, another freely rotatable wheel carried by the rudder, to facilitate launching the vehicle from shore into a body of water.

3. A land vehicle of the character described converted for water travel, comprising a lightweight streamlined body having front fenders, a central passenger compartment, front wheels under the front fenders for land use of the vehicle, a steering wheel on a steering post in said compartment for operation by a driver, said post being operatively connected to the front wheels for steering the same on land, an engine inside said body, rear brake drums operatively connected to said engine and driven thereby, a rudder shaft at the rear of and inside said body, a rudder outside the body at the rear end thereof detachably engaged with said rudder shaft, a belt and pulley system operatively connecting said rudder shaft and steering post whereby the rudder is under control of said steering wheel, water drive means detachably mounted on the rear brake drums, said body having a closed underside, and elongated pontoons detachably secured to said front fenders and the underside of said body in airtight and watertight sealed relationship to define two large closed air chambers to render the body buoyant, said pontoons having central keels on their undersides, and a freely rotatable wheel carried by each keel, another freely rotatable wheel carried by the rudder to facilitate launching the vehicle from shore into a body of water, said body having a folding retractable hard top roof over said compartment, and a pair of horizontal doors slidably disposed and movable forwardly to close said compartment, said body having air vents at its front end communicating with said compartment to ventilate the compartment when the vehicle is in motion.

4. A land vehicle of the character described converted for water travel, comprising a lightweight streamlined body having front fenders, a central passenger compartment, front wheels under the front fenders for land use of the vehicle, a steering wheel on a steering post in said compartment for operation by a driver, said post being operatively connected to the front wheels for steering the same on land, an engine inside said body, rear brake drums operatively connected to said engine and driven thereby, a rudder shaft at the rear of and inside said body, a rudder outside the body at the rear end thereof detachably engaged with said rudder shaft, a belt and pulley system operatively connecting said rudder shaft and steering post whereby the rudder is under control of said steering wheel, water drive means detachably mounted on the rear brake drums, said body having a closed underside, and elongated pontoons detachably secured to said front fenders and the underside of said body in airtight and watertight sealed relationship to define two large closed air chambers to render the body buoyant, said body having a folding, retractable hard top roof over said compartment, a pair of horizontal doors slidably disposed and movable forwardly to close said compartment, said body having air vents at its front end communicating with said compartment to ventilate the compartment when the vehicle is in motion, said water drive means comprising ring-shaped paddle wheels with paddles spaced circumferentially around the paddle wheels.

5. A land vehicle of the character described converted for water travel, comprising a lightweight streamlined body having front fenders, a central passenger compartment, front wheels under the front fenders for land use of the vehicle, a steering wheel on a steering post in said compartment for operation by a driver, said post being operatively connected to the front wheels for steering the same on land, an engine inside said body, rear brake drums operatively connected to said engine and driven thereby, a rudder shaft at the rear of and inside said body, a rudder outside the body at the rear end thereof detachably engaged with said rudder shaft, a belt and pulley system operatively connecting said rudder shaft and steering post whereby the rudder is under control of said steering wheel, water drive means detachably mounted on the rear brake drums, said body having a closed underside, and elongated pontoons detachably secured to said front fenders and the underside of said body in airtight and watertight sealed relationship to define two large closed air chambers to render the body buoyant, each of said pontoons having internally concave opposed sides, a flange extending laterally from one edge of one of said sides with holes in said flange registering with other holes in the underside of said body, bolts extending through the registering holes securing the flange to the underside of said body, a resilient sealing strip between said flange and the underside of the body effecting a tight seal thereat, a depending flange at the free edge of the other side of the pontoon, said body having channels formed therein at the fenders and receiving the depending flanges of the pontoons, and resilient sealing gasket strips in the channels engaged by the depending flanges, whereby the air chambers are rendered airtight and watertight.

6. A land vehicle of the character described converted for water travel, comprising a lightweight streamlined body having front fenders, a central passenger compartment, front wheels under the front fenders for land use of the vehicle, a steering wheel on a steering post in said compartment for operation by a driver, said post being operatively connected to the front wheels for steering the same on land, an engine inside said body, rear brake drums operatively connected to said engine and driven thereby, a rudder shaft at the rear of and inside said body, a rudder outside the body at the rear end thereof detachably engaged with said rudder shaft, a belt and pulley system operatively connecting said rudder shaft and steering post whereby the rudder is under control of said steering wheel, water drive means detachably mounted on the rear brake drums, said body having a closed underside, and elongated pontoons detachably secured to said front fenders and the underside of said body in airtight and watertight sealed relationship to define two large closed air chambers to render the body buoyant, each of said pontoons having internally concave opposed sides, a flange extending laterally from one edge of one of said sides with holes in said flange registering with other holes in the underside of said body, bolts extending through the registering holes securing the flange to the underside of siad body, a resilient sealing strip between said flange and the underside of the body effecting a tight seal thereat, a depending flange at the free edge of the other side of the pontoon, said body having channels formed therein at the fenders and receiving the depending flanges of the pontoons, and resilient sealing gasket strips in the channels engaged by the depending flanges, whereby the air chambers are rendered airtight and watertight, said body having a folding retractable hard top roof over said compartment, and a pair of horizontal doors slidably disposed and movable forwardly to close said compartment, said body having air vents at its front end communicating with said compartment to ventilate the compartment when the vehicle is in motion.

References Cited by the Examiner
UNITED STATES PATENTS

| | | | |
|---|---|---|---|
| 1,177,625 | 4/16 | Hopper | 9—1 |
| 1,237,175 | 8/17 | Cook et al. | 115—1 |
| 1,289,808 | 12/18 | Kennedy et al. | 115—1 |
| 1,331,221 | 2/20 | Swanson | 115—1 |
| 2,341,165 | 2/44 | Todd | 115—1 |
| 2,979,016 | 4/61 | Rossi | 115—1 |
| 3,020,872 | 2/62 | Gierczic | 115—12 |
| 3,131,666 | 5/64 | Sessions | 115—1 |

MILTON BUCHLER, *Primary Examiner.*

ANDREW H. FARRELL, *Examiner.*